(12) United States Patent
Takahashi et al.

(10) Patent No.: US 9,815,469 B2
(45) Date of Patent: Nov. 14, 2017

(54) VEHICLE CONTROL DEVICE AND METHOD FOR CONTROLLING THE SAME

(71) Applicant: JATCO Ltd, Fuji-shi, Shizuoka (JP)

(72) Inventors: Kunihiro Takahashi, Atsugi (JP); Yoshinobu Kawamoto, Seoul (KR); Hideshi Wakayama, Hadano (JP)

(73) Assignee: JATCO Ltd, Fuji-Shi (JP)

( * ) Notice: Subject to any disclaimer, the term of this patent is extended or adjusted under 35 U.S.C. 154(b) by 0 days.

(21) Appl. No.: 15/121,131

(22) PCT Filed: Feb. 25, 2015

(86) PCT No.: PCT/JP2015/055398
§ 371 (c)(1),
(2) Date: Aug. 24, 2016

(87) PCT Pub. No.: WO2015/133345
PCT Pub. Date: Sep. 11, 2015

(65) Prior Publication Data
US 2017/0008524 A1    Jan. 12, 2017

(30) Foreign Application Priority Data

Mar. 4, 2014  (JP) ................................ 2014-041470

(51) Int. Cl.
*B60W 10/02* (2006.01)
*B60W 10/06* (2006.01)
(Continued)

(52) U.S. Cl.
CPC .......... *B60W 30/186* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 2002/0004437 A1* | 1/2002 | Asayama | B60W 10/06 477/45 |
| 2004/0110584 A1* | 6/2004 | Sawada | B60W 10/06 474/18 |
| 2006/0189436 A1* | 8/2006 | Nakashima | B60W 10/02 477/174 |

FOREIGN PATENT DOCUMENTS

JP    2008-215451 A    9/2008

* cited by examiner

*Primary Examiner* — Edwin A Young
(74) *Attorney, Agent, or Firm* — Foley & Lardner LLP

(57) ABSTRACT

A vehicle control device calculates a target line pressure based on an instructed torque capacity of a friction engaging element and a belt capacity when the friction engaging element is determined as not engaging. Belt capacity is calculated using an input torque of a continuously variable transmission mechanism. The device calculates torque down in a driving source based on an upper limit line pressure when the calculated target line pressure exceeds such line pressure. A limit torque capacity of the friction engaging element is calculated using the input torque and a belt capacity when the friction engaging element is determined as not engaging. The belt capacity is calculated using an actual line pressure. The device restrains a slip between pulleys and a power transmitting member using the target line pressure, the torque down, and the limit torque capacity when the friction engaging element is determined as not engaging.

7 Claims, 6 Drawing Sheets

(51) Int. Cl.
*B60W 10/107* (2012.01)
*B60W 30/186* (2012.01)
*F16H 61/02* (2006.01)
*F16H 61/12* (2010.01)
*B60W 50/038* (2012.01)

(52) U.S. Cl.
CPC ........ *B60W 10/107* (2013.01); *B60W 50/038* (2013.01); *F16H 61/02* (2013.01); *F16H 61/12* (2013.01); *B60W 2710/027* (2013.01); *B60W 2710/1022* (2013.01); *B60W 2710/1044* (2013.01)

VEHICLE CONTROL DEVICE AND METHOD FOR CONTROLLING THE SAME

TECHNICAL FIELD

The present invention relates to a vehicle control.

BACKGROUND ART

A vehicle including a stepped transmission possibly generates a deviation between an operating position of a manual valve coupled to a shift lever and an operating position of a pressure regulating valve based on an instruction signal with an inhibitor switch to detect a position of the shift lever (hereinafter, such deviation is referred to as "discrepancy"). This is because that a sensing range (a conductive area) by the inhibitor switch is configured slightly wider than a switching range of the manual valve. The discrepancy occurs, for example, when the shift lever is held at an intermediate position between an N range and a D range to move the shift lever from the N range to the D range. In this case, the instruction signal by the inhibitor switch becomes a signal corresponding to the D range. On the basis of the instruction signal by the inhibitor switch, instructed pressure to a clutch heightens. However, the manual valve remains at a position corresponding to the N range; therefore, hydraulic pressure is not supplied to the clutch. Afterwards, the movement of the shift lever up to the D range sets the manual valve at a position corresponding to the D range, thereby starting supplying the hydraulic pressure to the clutch. At this time, the instructed pressure to the clutch with the pressure regulating valve has already heightened. Accordingly, the start of supply of the hydraulic pressure to the clutch possibly causes a rapid increase in hydraulic pressure in the clutch. This suddenly engages the clutch, possibly causing a large engaging shock.

In contrast to this, Japanese Patent Application No. 2007-052398 discloses a reduction in an instructed pressure to a clutch in case of discrepancy.

SUMMARY OF INVENTION

The technique is premised on a vehicle including a stepped transmission and therefore does not consider a vehicle including a continuously variable transmission using a belt or a similar member.

Even the use of the technique generates the discrepancy, and a belt capacity becomes insufficient in the continuously variable transmission. Insufficient belt sandwiching force possibly causes a belt slip.

In contrast to this, in the case of discrepancy, it is also possible to preset a belt capacity at which the belt slip does not occur to restrain the belt slip.

However, a situation where the discrepancy occurs is not limited to the case of the above-described change from the N range to the D range. For example, the discrepancy occurs also in the case where the shift lever once moves up to a position between the D range and the N range when the shift lever is moved from an L range to the D range and a similar case. Thus, depending on the situation of generating the discrepancy, an input torque and a speed ratio of the continuously variable transmission differ; therefore, the belt capacity at which the belt slip can be restrained differs. Accordingly, in case of discrepancy, only configuring the belt capacity of the continuously variable transmission to the preset belt capacity fails to sufficiently restrain the belt slip.

The present invention has been invented to solve the problem. An object of the present invention is to restrain a belt slip in a continuously variable transmission due to discrepancy according to a state of a vehicle at the time.

According to a certain aspect of the present invention, a vehicle control device for controlling a vehicle including a continuously variable transmission mechanism and a friction engaging element, the continuously variable transmission mechanism being configured by stretching a power transmitting member between two pulleys, the friction engaging element being configured to change power transmission state between a driving source and a driving wheel, the vehicle control device is provided. The vehicle control device includes an engaging determination unit configured to determine whether the friction engaging element engages or not on the basis of an engaging instruction and a rotation difference between before and after a rotation of the friction engaging element; a line pressure calculation unit configured to calculate a target line pressure on the basis of an instructed torque capacity of the friction engaging element and a belt capacity when the engaging determination unit determines that the friction engaging element does not engage by the engaging instruction, the belt capacity being calculated on the basis of an input torque of the continuously variable transmission mechanism; a drive torque calculation unit configured to calculate an amount of torque down in the driving source on the basis of the upper limit line pressure when the calculated target line pressure is higher than the upper limit line pressure; a torque capacity calculation unit configured to calculate a limit torque capacity of the friction engaging element on the basis of the input torque of the continuously variable transmission mechanism and a belt capacity when the friction engaging element is determined as not engaging, the belt capacity being calculated on the basis of an actual line pressure; and a restraining unit configured to restrain a slip between the pulleys and the power transmitting member in the continuously variable transmission mechanism on the basis of the target line pressure, the amount of torque down, and the limit torque capacity when the friction engaging element is determined as not engaging.

According to another aspect of the present invention, a vehicle control method for controlling a vehicle including a continuously variable transmission mechanism and a friction engaging element, the continuously variable transmission mechanism being configured by stretching a power transmitting member between two pulleys, the friction engaging element being configured to change power transmission state between a driving source and a driving wheel, is provided. The vehicle control method includes determining whether the friction engaging element engages or not on the basis of an engaging instruction and a rotation difference between before and after a rotation of the friction engaging element; calculating a target line pressure on the basis of an instructed torque capacity of the friction engaging element and a belt capacity when the friction engaging element is determined as not engaging by the engaging instruction, the belt capacity being calculated on the basis of an input torque of the continuously variable transmission mechanism; calculating an amount of torque down in the driving source on the basis of the upper limit line pressure when the calculated target line pressure is higher than the upper limit line pressure; calculating a limit torque capacity of the friction engaging element on the basis of the input torque of the continuously variable transmission mechanism and a belt capacity when the friction engaging element is determined as not engaging, the belt capacity being calculated on the basis of an actual line pressure; and restraining a slip between the pulleys and the power transmitting member in the continuously variable transmission mechanism on the basis of the target line pressure, the amount of torque down, and the limit torque capacity when the friction engaging element is determined as not engaging.

According to these aspects, the belt slip is restrained on the basis of the target line pressure, which is calculated on the basis of the instructed torque capacity of the friction engaging element and the belt capacity calculated on the basis of the input torque, the amount of torque down, which is calculated on the basis of the target line pressure and the upper limit line pressure, and the limit torque capacity, which is calculated on the basis of the input torque and the belt capacity calculated on the basis of the actual line pressure. This ensures restraining the belt slip according to a state of the vehicle in which the discrepancy occurs. For example, regardless of during stop or running of the vehicle, the present invention ensures restraining the belt slip.

DESCRIPTION OF EMBODIMENTS

The following describes an embodiment of the present invention with reference to the accompanying drawings. It should be noted that, in the following description, a "speed ratio" of a certain transmission mechanism indicates a value obtained by dividing an input rotation speed of this transmission mechanism by an output rotation speed of this transmission mechanism.

Figure 1:
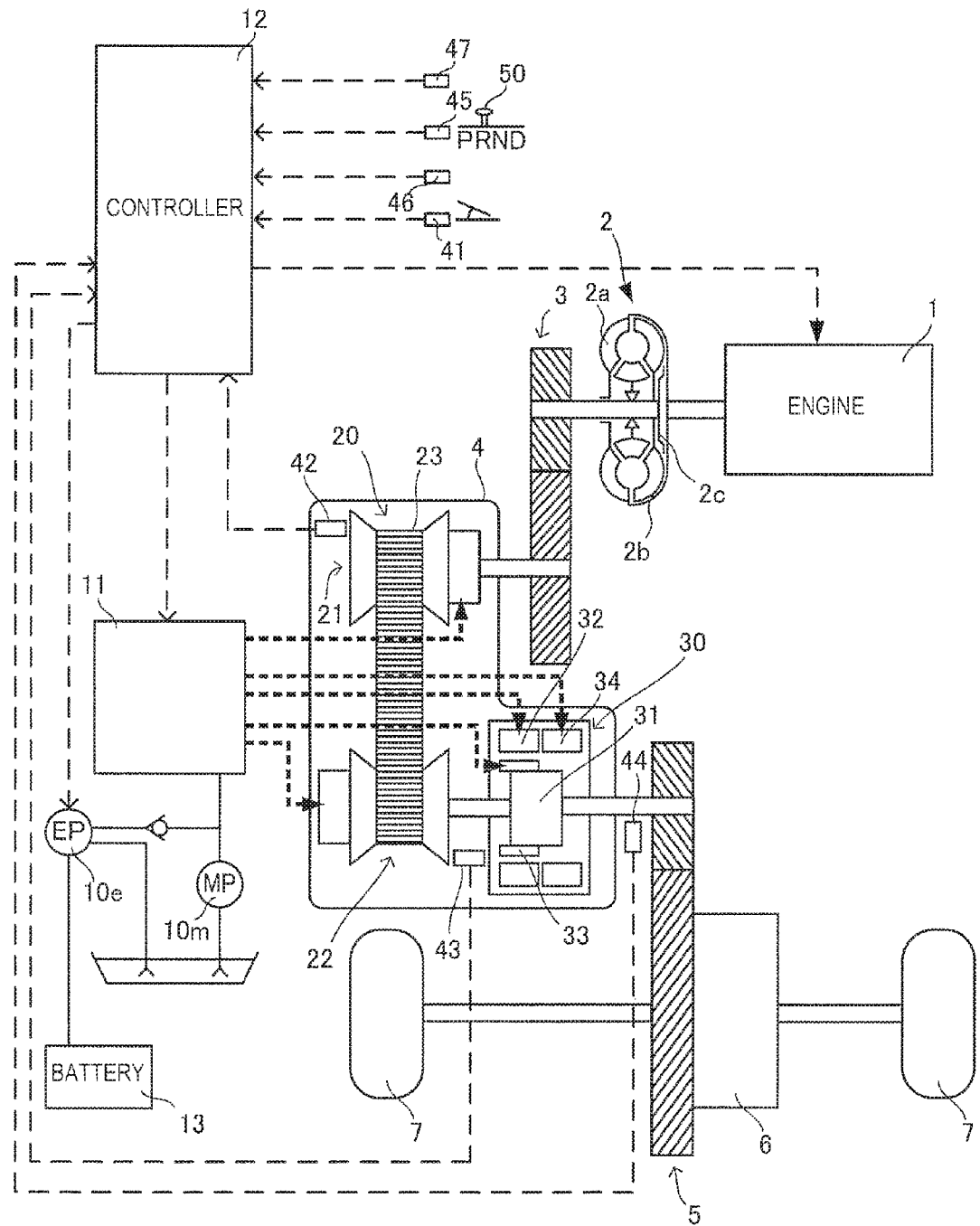
FIG. 1 is a schematic configuration diagram of a vehicle of the embodiment.

FIG. 1 is a schematic configuration diagram of a vehicle according to the embodiment of the present invention. This vehicle includes an engine 1 as a driving source. An output rotation of the engine 1 is input to a pump impeller 2a in a torque converter 2 with a lock-up clutch 2c. The output rotation is then transmitted from a turbine runner 2b to a driving wheel 7 via a first gear train 3, a continuously variable transmission (hereinafter simply referred to as a "transmission 4"), a second gear train 5, and an actuator 6.

The transmission 4 includes a mechanical oil pump 10m and an electric oil pump 10e. The mechanical oil pump 10m is driven using some power from the engine 1 through an input of a rotation of the engine 1. The electric oil pump 10e is driven by supply of electric power from a battery 13. The transmission 4 includes a hydraulic control circuit 11. The hydraulic control circuit 11 regulates hydraulic pressure from the mechanical oil pump 10m or the electric oil pump 10e and supplies the hydraulic pressure to respective portions in the transmission 4.

The transmission 4 includes a belt-type continuously variable transmission mechanism (hereinafter referred to as a "variator 20") as a friction transmission mechanism and a sub-transmission mechanism 30, which is disposed in series with the variator 20. "Disposed in series" means that the variator 20 and the sub-transmission mechanism 30 are disposed in series in a power transmission path from the engine 1 up to the driving wheel 7. The sub-transmission mechanism 30 may be directly coupled to an output shaft of the variator 20 like this example or may be coupled via other shift and power transmission mechanisms (for example, a gear train). Alternatively, the sub-transmission mechanism 30 may be coupled to a front stage (an input shaft side) of the variator 20.

The variator 20 includes a primary pulley 21, a secondary pulley 22, and a V belt 23, which is stretched between the pulleys 21 and 22. The variator 20 changes a width of a V groove according to primary pulley pressure and secondary pulley pressure. This changes a radius that the V belt 23 is in contact with the respective pulleys 21 and 22, thus steplessly changing a speed ratio of the variator 20.

The variator 20 is a one-side-pressure regulating transmission where line pressure is set on the basis of the secondary pulley pressure and reducing and regulating the line pressure generates the primary pulley pressure.

The sub-transmission mechanism 30 is a transmission mechanism having two stages for forward and one stage for backward. The sub-transmission mechanism 30 includes a Ravigneaux type planetary gear mechanism 31 and a plurality of friction engaging elements (a Low brake 32, a High clutch 33, and a Rev brake 34). The Ravigneaux type planetary gear mechanism 31 couples carriers of two planetary gears. The friction engaging elements are coupled to a plurality of rotating elements constituting the Ravigneaux type planetary gear mechanism 31 to change a linking state of these elements. Adjusting the hydraulic pressure supplied to the respective friction engaging elements 32 to 34 to change an engaging or a disengaging state of the respective friction engaging elements 32 to 34 changes a gear position of the sub-transmission mechanism 30.

In the transmission 4, while a shift lever 50 is in a traveling range (a D range, an L range, an S range, and an R range), any of the friction engaging elements 32 to 34 are engaged to ensure transmission of the power from the transmission 4. While the shift lever 50 is in a non-traveling range (an N range and a P range), all the friction engaging elements 32 to 34 are disengaged to disable the transmission of the power from the transmission 4.

Figure 2:
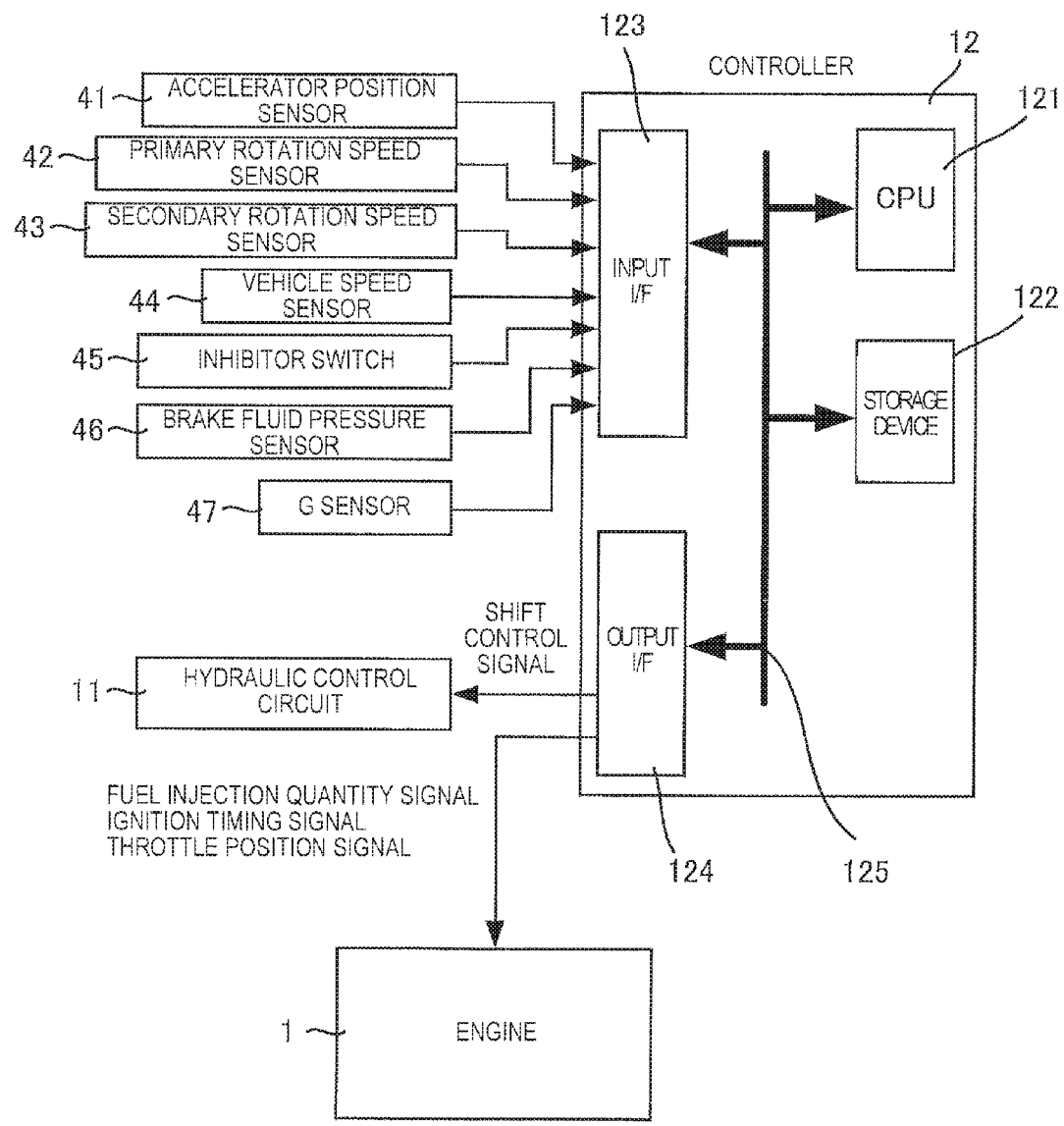
FIG. 2 is a schematic configuration diagram of a controller.

A controller 12 is a controller that integrally controls the engine 1 and the transmission 4. As illustrated in FIG. 2, the controller 12 includes a CPU 121, a storage device 122 constituted of a RAM and a ROM, an input interface 123, an output interface 124, and a bus 125, which couples these members to one another.

To the input interface 123, an output signal from an accelerator position sensor 41, which detects an accelerator position, a manipulated variable of an accelerator pedal, an output signal from a primary rotation speed sensor 42, which detects a rotation speed of the primary pulley 21, an output signal from a secondary rotation speed sensor 43, which detects a rotation speed of the secondary pulley 22, an output signal from a vehicle speed sensor 44, which detects a vehicle speed, an output signal from an inhibitor switch 45, which detects a position of the shift lever 50, signals from a brake fluid pressure sensor 46, which detects brake fluid pressure of a wheel, and an engine rotation speed sensor 47, and a similar signal are input.

The storage device 122 stores a control program for the engine 1, a shift control program for the transmission 4, and various maps and tables used for these programs. The CPU 121 reads and runs the programs stored in the storage device 122, performs various operation processes on various signals input through the input interface 123, creates a fuel injection quantity signal, an ignition timing signal, a throttle position signal, a shift control signal (a torque instruction signal), and outputs the created signals to the engine 1 and the hydraulic control circuit 11 through the output interface 124. The storage device 122 appropriately stores various values used for the operation processes by the CPU 121 and the results of the operation.

The hydraulic control circuit 11 is constituted of a plurality of flow passages and a plurality of hydraulic control valves. The hydraulic control circuit 11 controls the plurality of hydraulic control valves to switch a supply passage for hydraulic pressure on the basis of a shift control signal from the controller 12. Additionally, the hydraulic control circuit 11 prepares required hydraulic pressure from the hydraulic pressure generated in the mechanical oil pump 10m or the electric oil pump 10e and supplies this hydraulic pressure to the respective portions of the transmission 4. This changes the speed ratio of the variator 20 and the gear position of the sub-transmission mechanism 30, shifting the transmission 4.

The hydraulic pressure supplied to the sub-transmission mechanism 30 is controlled by a manual valve and a pressure regulating valve. The manual valve is mechanically coupled to the shift lever 50 to be in conjunction with an operation of the shift lever 50 and switches oil passages. The pressure regulating valve is driven by the torque instruction signal calculated on the basis of a signal from the inhibitor switch 45 and a similar signal and supplies the hydraulic pressure adjusted according to the torque instruction signal to any of the friction engaging elements 32 to 34. The plurality of pressure regulating valves are disposed corresponding to the respective friction engaging elements 32 to 34.

A sensing range of the inhibitor switch 45 to sense the position of the shift lever 50 in the traveling range is set wider. Therefore, assume that the shift lever 50 is held between the non-traveling range and the traveling range, for example, the shift lever 50 is held between the N range and the D range in the middle of change from the N range to the D range. To change the shift lever 50 from the L range to the D range during traveling, when the shift lever 50 goes beyond the D range and is held between the D range and the N range, the signal from the inhibitor switch 45 becomes a signal corresponding to the D range. Meanwhile, the manual valve is possibly set at a position corresponding to the N range, causing the discrepancy. If the discrepancy thus occurs, oil passages communicating with the Low brake 32 and the High clutch 33 are drained. Therefore, the hydraulic pressure is not supplied to the Low brake 32 and the High clutch 33, and thus the sub-transmission mechanism 30 becomes a neutral state. Such state occurs, for example, when a driver holds the shift lever 50 between the N range and the D range and when the shift lever 50 is held between the N range and the D range against the driver's will.

With presence of such discrepancy, the signal from the inhibitor switch 45 becomes a signal corresponding to the traveling range. Therefore, instructed pressure (hereinafter referred to as instructed clutch pressure) from the pressure regulating valve to the friction engaging elements 32 to 34 heightens; however, the manual valve does not supply the hydraulic pressure. Afterwards, operating the shift lever 50 to the traveling range starts supplying the hydraulic pressure from the manual valve. However, since the instructed clutch pressure heightens, a maximum hydraulic pressure while the friction engaging elements 32 to 34 are engaged is supplied to the friction engaging elements 32 to 34, possibly resulting in sudden engaging of the friction engaging elements 32 to 34. If the friction engaging elements 32 to 34 are suddenly engaged and a torque larger than the belt capacity of the variator 20 is input to the variator 20, a belt slip possibly occurs in the variator 20. Additionally, as described above, the discrepancy also occurs during traveling. If the discrepancy occurs during traveling, occurrence of the belt slip needs to be restrained according to the operating state of the vehicle. Therefore, this embodiment performs a discrepancy control described later to restrain the belt slip in the variator 20. It should be noted that, although the following describes with an example of engaging the Low brake 32 among the friction engaging elements 32 to 34, the same applies to the case where the High clutch 33 or the Rev brake 34 is engaged.

Figure 3:
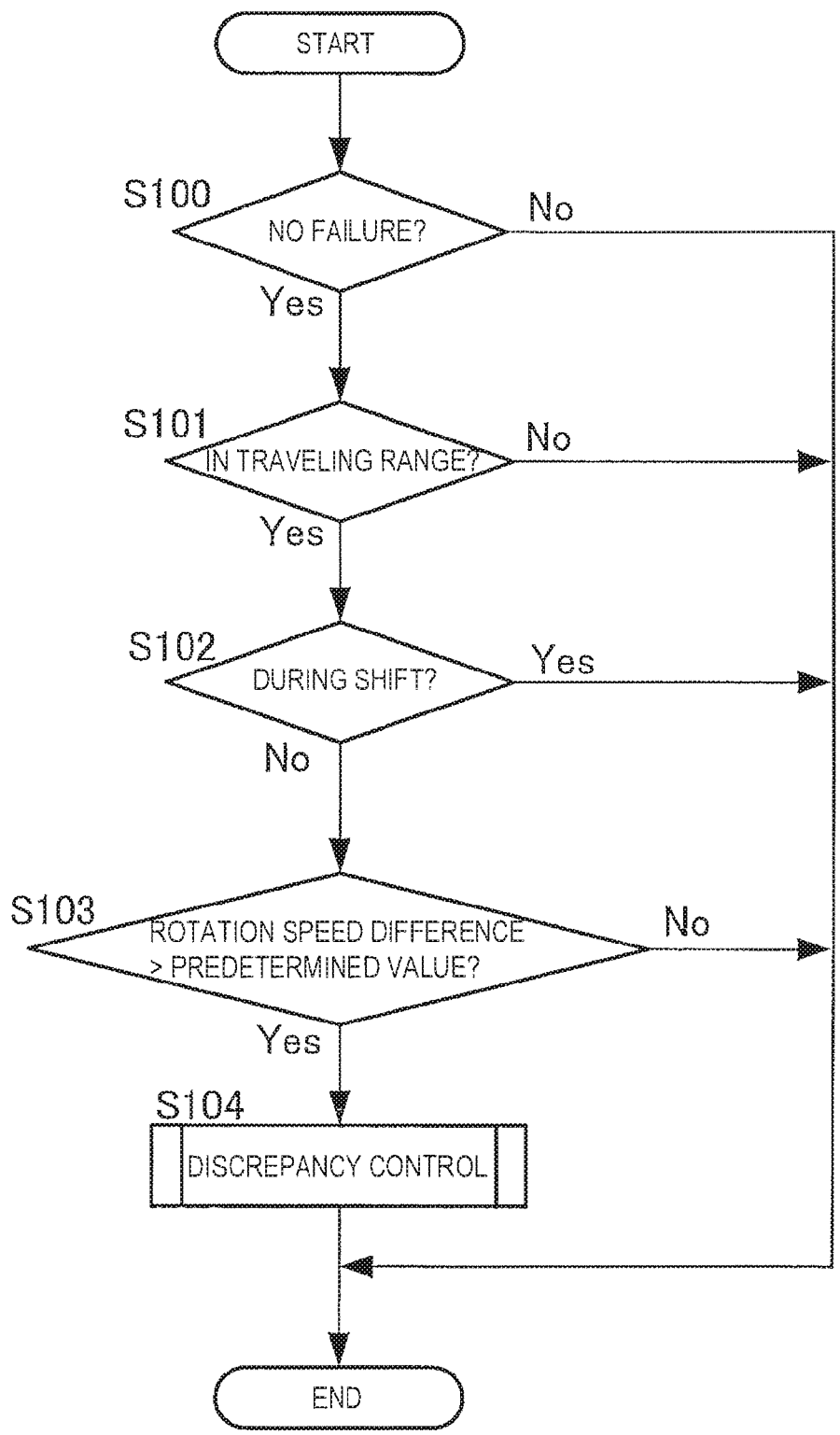
FIG. 3 is a flowchart describing an execution determination process in a discrepancy control.

The following describes an execution determination process for the discrepancy control of this embodiment with reference to the flowchart in FIG. 3.

At Step S100, the controller 12 determines whether a sensor system such as the inhibitor switch 45 and a rotating system such as the variator 20 is free from a failure or not. With absence of the failure, the process proceeds to Step S101, and with present of the failure, this control terminates.

At Step S101, the controller 12 determines whether the shift lever 50 is in the traveling range or not on the basis of the signal from the inhibitor switch 45. When the controller 12 determines that the shift lever 50 is in the traveling range on the basis of the signal from the inhibitor switch 45, the process proceeds to Step S102. When the controller 12 determines that the shift lever 50 is in the non-traveling range on the basis of the signal from the inhibitor switch 45, this control terminates.

At Step S102, the controller 12 determines whether the shift lever 50 is being shifted or not. When the shift lever 50 is not being shifted, the process proceeds to Step S103. When the shift lever 50 is being shifted, this control terminates.

At Step S103, the controller 12 determines whether a rotation speed difference between before and after application of the Low brake 32 is larger than a predetermined value or not. The predetermined value is a value set according to the respective friction engaging elements 32 to 34 and with which the friction engaging elements 32 to 34 can be determined as not being engaged. The predetermined value is selected on the basis of the friction engaging elements 32 to 34 to which an engaging instruction has been made. When the rotation speed difference is larger than the predetermined value set according to the Low brake 32, the controller 12 determines that the Low brake 32 that should be engaged is not engaged. The rotation speed difference is calculated on the basis of the signal from the secondary rotation speed sensor 43 and a signal from the vehicle speed sensor 44. When the rotation speed difference is larger than the predetermined value, since the shift lever 50 is in the traveling range by the determination based on the inhibitor switch 45 and the Low brake 32 is not engaged although the shift lever 50 is not being shifted, the oil passage communicated with the Low brake 32 is drained by the manual valve. Therefore, the controller 12 determines that the discrepancy occurs. When the rotation speed difference is larger than the predetermined value, the process proceeds to Step S104. When the rotation speed difference is the predetermined value or less, this control terminates.

At Step S104, the controller 12 performs the discrepancy control.

Figure 4:
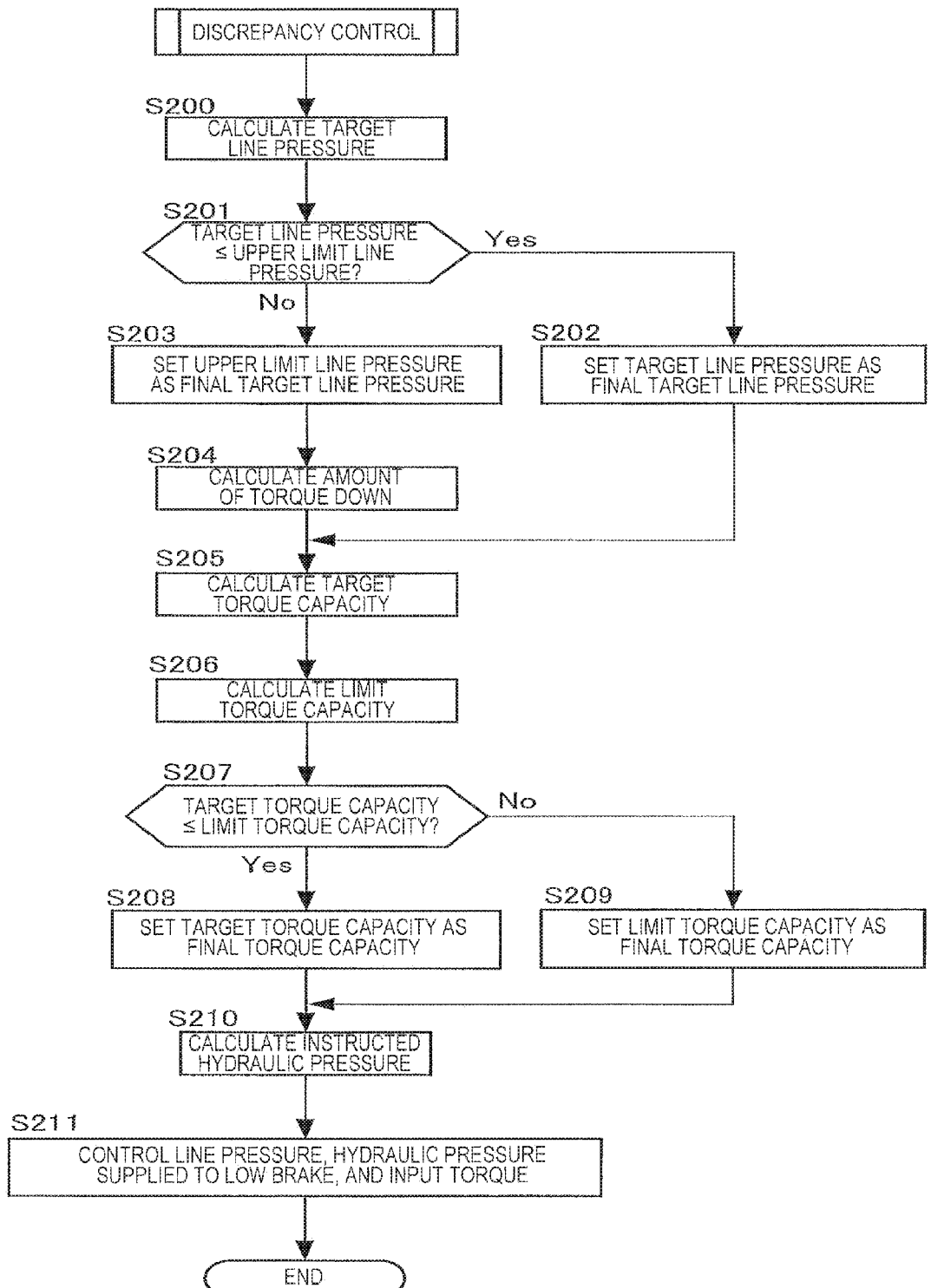
FIG. 4 is a flowchart describing processes in the discrepancy control.

The following describes processes in the discrepancy control with reference to the flowchart in FIG. 4.

At Step S200, the controller 12 calculates a belt capacity at which the belt slip does not occur in the variator 20, a belt capacity Tsb in the secondary pulley 22 in this embodiment, on the basis of an instructed torque capacity Tcl of the Low brake 32 on which the engaging instruction has been made and a current input torque Tcin of the Low brake 32 to calculate a target line pressure PLt on the basis of the calculated belt capacity Tsb. The input torque Tcin of the Low brake 32 is a value found by multiplying an input torque Tin of the variator 20 by a speed ratio rv of the variator 20.

Figure 5:
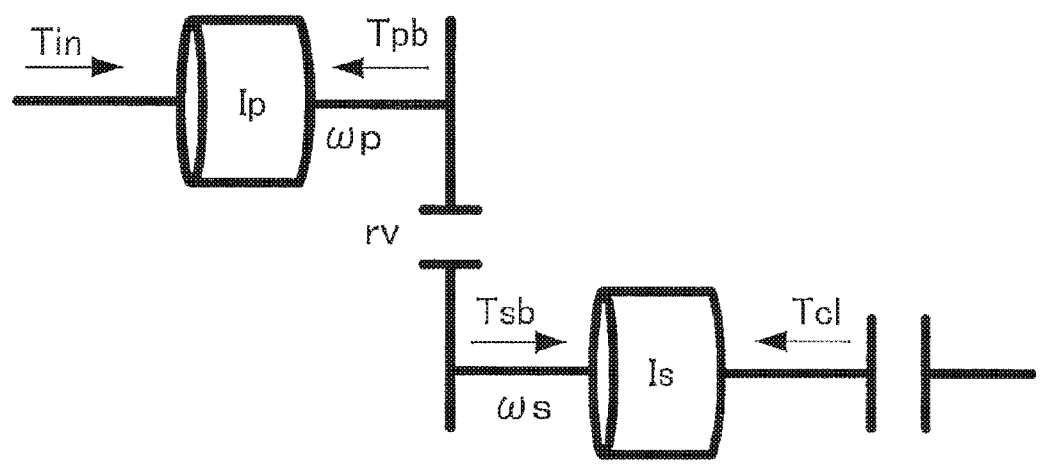
FIG. 5 is a drawing illustrating a simple model of a transmission.

The transmission 4 can be expressed by the simple model as illustrated in FIG. 5. In FIG. 5, Tpb denotes the belt capacity in the primary pulley 21. Tcl denotes a torque capacity of the Low brake 32. Ip denotes an inertia of the primary pulley 21. Is denotes an inertia of the secondary pulley 22. ωp denotes an angler acceleration on a primary pulley shaft. ωs denotes an angler acceleration on a secondary pulley shaft.

The transmission 4 meets equations of motions of Expression (1) and Expression (2).

$$Ip \times \omega p = Tin - Tpb \quad (1)$$

$$Is \times \omega s = Tsb - Tcl \quad (2)$$

ωp, ωs, and rv meet a relationship of Expression (3) and Tpb, Tsb, and rv meet a relationship of Expression (4).

$$\omega p = rv \times \omega s \quad (3)$$

$$rv \times Tpb = Tsb \quad (4)$$

The use of Expressions (1) to (4) can express Tsb like Expression (5).

$$Tsb = (rv^2 \times Ip/(rv^2 \times Ip + Is))Tcl + (Is/(rv^2 \times Ip + Is))rv \times Tin \quad (5)$$

The speed ratio rv in the variator 20 is calculated on the basis of the output signal from the primary rotation speed sensor 42 and the output signal from the secondary rotation speed sensor 43. The inertias Ip and Is are each preliminary stored, and the input torque Tin of the variator 20 is calculated on the basis of an engine torque Te calculated using the output signal from the accelerator position sensor 41, the output signal from the engine rotation speed sensor 47, and a similar signal.

The controller 12 calculates the belt capacity Tsb of the variator 20 using Expression (5) on the basis of the instructed torque capacity Tcl of the Low brake 32 and the current input torque Tcin (=rv×Tin) of the Low brake 32. Then, the controller 12 performs an operation such as a multiplication of the calculated belt capacity Tsb by a safety factor to calculate the target line pressure PLt at which the belt slip does not occur in the variator 20.

At Step S201, the controller 12 determines whether the target line pressure PLt is an upper limit line pressure PLlim or less or not. The upper limit line pressure PLlim is a preset value and is an upper limit value of the line pressure that can be generated by the mechanical oil pump 10m or the electric oil pump 10e. When the target line pressure PLt is the upper limit line pressure PLlim or less, the process proceeds to Step S202. When the target line pressure PLt is higher than the upper limit line pressure PLlim, the process proceeds to Step S203.

At Step S202, the controller 12 sets the target line pressure PLt as a final target line pressure PLtf.

At Step S203, the controller 12 sets the upper limit line pressure PLlim as the final target line pressure PLtf.

At Step S204, the controller 12 calculates the belt capacity Tsb in the secondary pulley 22 when the upper limit line pressure PLlim is set as the final target line pressure PLtf. On the basis of the calculated belt capacity Tsb and the instructed torque capacity Tcl of the Low brake 32, the input torque Tin of the variator 20 to be torqued down is calculated. The belt capacity Tsb in the secondary pulley 22 is obtained by performing an operation such as a division of the final target line pressure PLtf by the safety factor. The input torque Tin of the variator 20 can be expressed like Expression (6) using Expressions (1) to (4) similar to Expression (5).

$$Tin = ((rv^2 \times Ip + Is)/(rv \times Is))Tsb - ((rv^2 \times Ip)/(rv \times Is))Tcl \quad (6)$$

The use of the calculated belt capacity for Tsb and the instructed torque capacity for Tcl in Expression (6) ensures calculating the input torque Tin of the variator 20 according to the final target line pressure PLtf.

The controller 12 calculates an amount of torque down Tdown in the engine 1 on the basis of a deviation between the current input torque Tin and the calculated input torque Tin.

At Step S205, the controller 12 calculates a target torque capacity Tclt of the Low brake 32 on the basis of the current input torque Tcin of the Low brake 32. It is only necessary that the target torque capacity Tclt be a value by which the supply of hydraulic pressure to the Low brake 32 can be determined. The target torque capacity Tclt is a value at which the Low brake 32 enters in a predetermined slip state. As determined at Step S103, the rotation speed difference becomes larger than the predetermined value. Increasing the torque capacity Tcl of the Low brake 32 in this state suddenly engages the Low brake 32, possibly resulting in a large engaging shock. Therefore, here, the target torque capacity Tclt is calculated such that the predetermined slip state falls within the extent at which the engaging shock does not increase.

At Step S206, the controller 12 calculates the current belt capacity Tsb of the secondary pulley 22 on the basis of an actual line pressure PLa. The controller 12 calculates a limit torque capacity Tcllim on the basis of the calculated current belt capacity Tsb of the secondary pulley 22 and the current input torque Tcin of the Low brake 32 (=current input torque Tin of the variator 20×speed ratio rv). The torque capacity Tcl can be expressed like Expression (7) using Expressions (1) to (4) similar to Expression (5).

$$Tcl = ((rv^2 \times Ip + Is)/(rv^2 \times Ip))Tsb - (Is/(rv^2 \times Ip))rv \times Tin \quad (7)$$

The use of the calculated current belt capacity of the secondary pulley 22 for Tsb and the current input torque of the variator 20 for Tin in Expression (7) ensures calculating the limit torque capacity Tcllim.

If the torque capacity Tcl of the Low brake 32 increases while a response of the actual line pressure PLa (the belt capacity Tsb of the secondary pulley 22) to the target line pressure PLt delays, since proof stress of the variator 20 against the input torque is low, the belt slip possibly occurs in the variator 20. Accordingly, on the basis of the belt capacity Tsb of the secondary pulley 22, which is calculated on the basis of the actual line pressure PLa, the limit torque capacity Tcllim of the Low brake 32 is calculated. Limiting the torque capacity Tcl of the Low brake 32 on the basis of this limit torque capacity Tcllim ensures restraining the belt slip in the variator 20.

At Step S207, the controller 12 determines whether the target torque capacity Tclt calculated at Step S205 is the limit torque capacity Tcllim or less. When the target torque capacity Tclt is the limit torque capacity Tcllim or less, the process proceeds to Step S208. When the target torque capacity Tclt is larger than the limit torque capacity Tcllim, the process proceeds to Step S209.

At Step S208, the controller 12 sets the target torque capacity Tclt as a final torque capacity Tclf.

At Step S209, the controller 12 sets the limit torque capacity Tcllim as the final torque capacity Tclf.

At Step S210, the controller 12 calculates an instructed clutch pressure Pcl of the Low brake 32 on the basis of the final torque capacity Tclf. The instructed clutch pressure Pcl is obtained by multiplying the final torque capacity Tclf by a predetermined gain and the safety factor.

At Step S211, the controller 12 controls a line pressure PL and the hydraulic pressure supplied to the Low brake 32 on the basis of the final target line pressure PLtf and the instructed clutch pressure Pcl. When the torque down is required, the controller 12 controls the engine 1 on the basis of the amount of torque down Tdown to control the input torque Tin input to the variator 20.

Execution of these controls ensures preventing the variator 20 from causing the belt slip according to the state of the vehicle when the discrepancy occurs.

Figure 6:
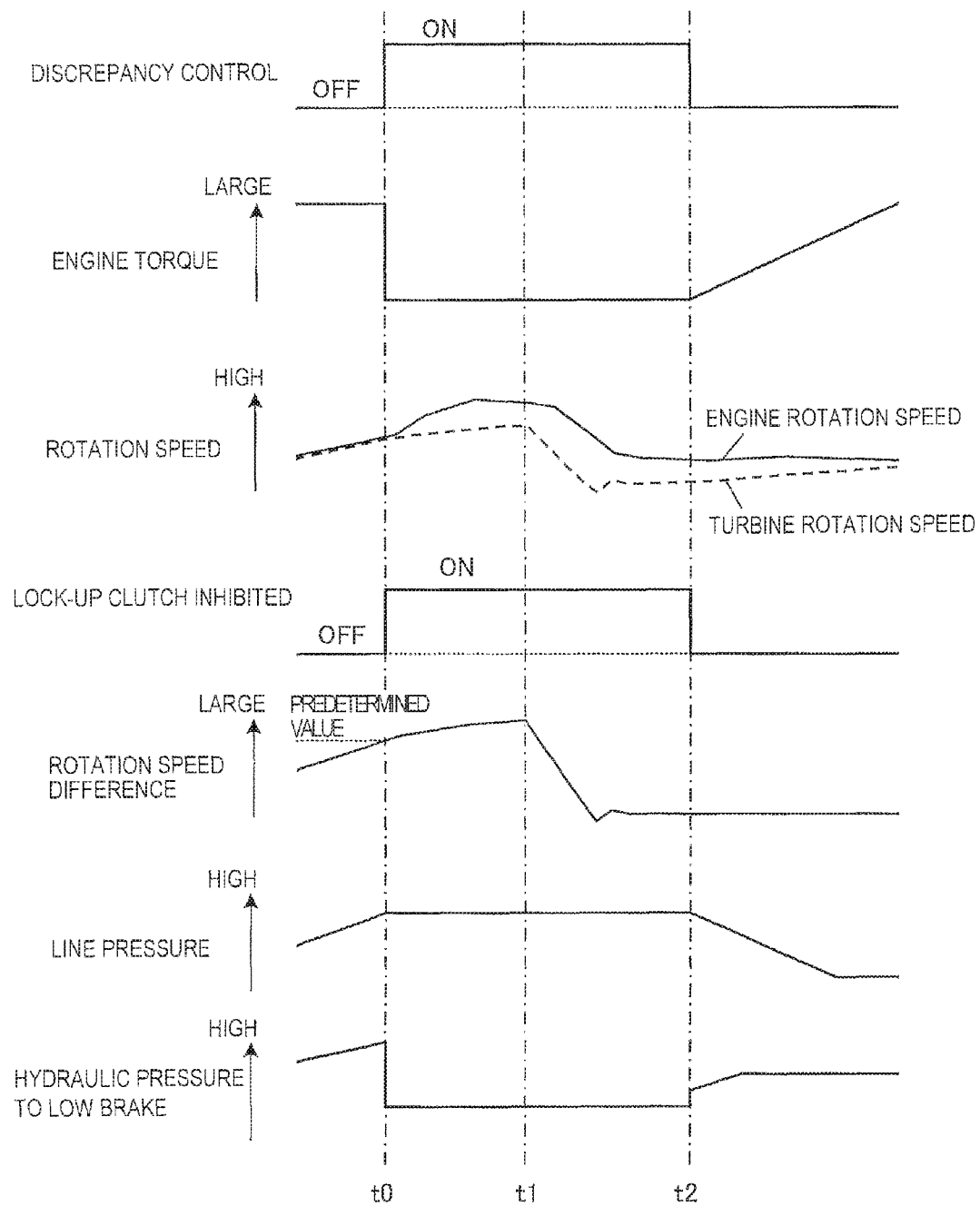
FIG. 6 is a timing chart when the discrepancy control is performed.

The following describes the discrepancy control with reference to the timing chart in FIG. 6.

When the shift lever 50 is held between the N range and the D range, the rotation speed difference is larger than the predetermined value at time t0, and the determination is made as discrepancy, the discrepancy control is performed. When the discrepancy control is performed and the target line pressure PLt is higher than the upper limit line pressure PLlim, the upper limit line pressure PLlim is set as the final target line pressure PLtf, and the line pressure PL is limited to the upper limit line pressure PLlim. The amount of torque down Tdown is calculated according to the limitation on the line pressure PL, and the engine torque Te reduces on the basis of the amount of torque down Tdown. When the target torque capacity Tclt is larger than the limit torque capacity Tcllim, the limit torque capacity Tcllim is set as the final torque capacity Tclf, the instructed clutch pressure Pcl of the Low brake 32 is calculated on the basis of the limit torque capacity Tcllim, and the hydraulic pressure of the Low brake 32 reduces on the basis of the instructed clutch pressure Pcl. It should be noted that, when the determination is made as discrepancy, to reduce the shock occurred while the Low brake 32 is engaged, engaging of the lock-up clutch 2c of the torque converter 2 is inhibited. Therefore, here, a turbine rotation speed reduces with respect to the engine rotation speed.

At time t1, operating the shift lever 50 to the D range decreases the rotation speed difference.

The discrepancy control terminates at time t2. It should be noted that, when the discrepancy control is terminated, to precisely determine a resolution of the discrepancy, an elapse of a state where the rotation speed difference becomes the predetermined value or less by predetermined time is set as a termination condition.

The following describes effects of the embodiment of the present invention.

If the discrepancy occurs in the vehicle including the variator 20, the target line pressure PLt is calculated on the basis of the instructed torque capacity Tcl of the Low brake 32 and the belt capacity Tsb, which is calculated on the basis of the input torque Tin of the variator 20. When the target line pressure PLt is higher than the upper limit line pressure PLlim, the amount of torque down Tdown is calculated on the basis of the upper limit line pressure PLlim, and the limit torque capacity Tcllim is calculated on the basis of the input torque Tin and the belt capacity Tsb, which is calculated on the basis of the actual line pressure PLa. Thus, the belt slip in the variator 20 is restrained on the basis of the target line pressure PLt, the amount of torque down Tdown, and the limit torque capacity Tcllim. This ensures restraining the belt slip according to the situation in which the discrepancy occurs. Even if the discrepancy occurs during stop and traveling, this ensures restraining the belt slip according to the state of the vehicle when the discrepancy occurs.

The limit torque capacity Tcllim is calculated on the basis of the input torque Tin and the belt capacity Tsb, which is calculated on the basis of the actual line pressure PLa to control the instructed clutch pressure Pcl of the Low brake 32 on the basis of the limit torque capacity Tcllim. This ensures restraining the belt slip in case of response delay of the actual line pressure PLa.

The line pressure PL is controlled on the basis of the target line pressure PLt or the upper limit line pressure PLlim, the engine torque Te is controlled on the basis of the amount of torque down Tdown, and the hydraulic pressure of the Low brake 32 is controlled on the basis of the limit torque capacity Tcllim. This ensures restraining the belt slip according to the state of the vehicle when the discrepancy occurs.

When the target line pressure PLt is higher than the upper limit line pressure PLlim, controlling the line pressure PL on the basis of the upper limit line pressure PLlim restrains the belt slip. When the target line pressure PLt is the upper limit line pressure PLlim or less, controlling the line pressure PL on the basis of the target line pressure PLt restrains the belt slip. This ensures restraining the belt slip on the basis of the line pressure PL that can be supplied.

When the target torque capacity Tclt is larger than the limit torque capacity Tcllim, controlling the hydraulic pressure (the torque capacity Tcl) of the Low brake 32 on the basis of the limit torque capacity Tcllim restrains the belt slip. When the target torque capacity Tclt is the limit torque capacity Tcllim or less, controlling the hydraulic pressure of the Low brake 32 on the basis of the target torque capacity Tclt restrains the belt slip. Accordingly, if there is a possibility of belt slip due to the response delay of the actual line pressure PLa, the hydraulic pressure of the Low brake 32 is limited to restrain the belt slip. When there is no possibility of belt slip due to the response delay of the actual line pressure PLa, the hydraulic pressure of the Low brake 32 is increased on the basis of the target torque capacity Tclt, ensuring quickly engaging the Low brake 32.

When the signal from the inhibitor switch 45 indicates the traveling range and the oil passage communicated with the Low brake 32 is drained by the manual valve, the status is determined as discrepancy. In case of such discrepancy, when the shift lever 50 becomes in the traveling range and the hydraulic pressure is supplied to the oil passage communicated with the Low brake 32 by the manual valve, the instructed clutch pressure in the pressure regulating valve has possibly already increased on the basis of the signal from the inhibitor switch 45. For example, this supplies the maximum hydraulic pressure during engaging to the Low brake 32, suddenly engages the Low brake 32, and causes the large engaging shock, possibly resulting in the belt slip. In this case, the embodiment performs the above-mentioned discrepancy control to restrain the engaging shock, ensuring restraining the belt slip.

The embodiments of the present invention described above are merely illustration of some application examples of the present invention and not of the nature to limit the technical scope of the present invention to the specific constructions of the above embodiments.

This embodiment describes the one-side-pressure regulating transmission that sets the line pressure on the basis of the secondary pulley pressure. However, the transmission may be a both-pressure-regulating transmission that sets a line pressure on the basis of higher hydraulic pressure among the secondary pulley pressure and the primary pulley pressure. With the both-pressure-regulating transmission, the target line pressure PLt is set by comparison of the secondary pulley pressure at which the belt slip does not occur and the primary pulley pressure.

It should be noted that, the discrepancy control may be performed on a vehicle including, a forward-reverse switching mechanism, a chain continuously variable transmission mechanism, and a similar member.

The present application claims a priority of Japanese Patent Application No. 2014-41470 filed with the Japan Patent Office on Mar. 4, 2014, all the contents of which are hereby incorporated by reference.

The invention claimed is:

1. A vehicle control device for controlling a vehicle including a continuously variable transmission mechanism and a friction engaging element, the continuously variable transmission mechanism being configured by stretching a power transmitting member between two pulleys, the friction engaging element being configured to change a power transmission state between a driving source and a driving wheel, the vehicle control device comprising:
a controller configured to determine whether the friction engaging element engages or not on the basis of an engaging instruction and a rotation difference between before and after a rotation of the friction engaging element;
calculate a target line pressure on the basis of an instructed torque capacity of the friction engaging element and a belt capacity when the friction engaging element is determined as not engaging by the engaging instruction, the belt capacity being calculated on the basis of an input torque of the continuously variable transmission mechanism;
calculate an amount of torque down in the driving source on the basis of an upper limit line pressure when the calculated target line pressure is higher than the upper limit line pressure;
calculate a limit torque capacity of the friction engaging element on the basis of the input torque of the continuously variable transmission mechanism and a belt capacity when the friction engaging element is determined as not engaging, the belt capacity being calculated on the basis of an actual line pressure; and
restrain a slip between the pulleys and the power transmitting member in the continuously variable transmission mechanism on the basis of the target line pressure, the amount of torque down, and the limit torque capacity when the friction engaging element is determined as not engaging.

2. The vehicle control device according to claim 1, wherein
the controller is configured to control a line pressure on the basis of the target line pressure or the upper limit line pressure, control a torque generated in the driving source on the basis of the amount of torque down, and control hydraulic pressure supplied to the friction engaging element on the basis of the limit torque capacity.

3. The vehicle control device according to claim 1, wherein the controller is configured to restrain the slip on the basis of at least the upper limit line pressure when the target line pressure is higher than the upper limit line pressure, and restrain the slip on the basis of at least the target line pressure when the target line pressure is the upper limit line pressure or less.

4. The vehicle control device according to claim 1, wherein
the controller is configured to calculate a target torque capacity of the friction engaging element when the friction engaging element is determined as not engaging, restrain the slip on the basis of at least the limit torque capacity when the target torque capacity is larger than the limit torque capacity, and restrain the slip on the basis of at least the target torque capacity when the target torque capacity is the limit torque capacity or less.

5. The vehicle control device according to claim 1, wherein
the controller is configured to determine that the friction engaging element does not engage by the engaging instruction when a signal from an inhibitor switch indicates a traveling range and an oil passage communicating with the friction engaging element is drained.

6. A vehicle control method for controlling a vehicle including a continuously variable transmission mechanism and a friction engaging element, the continuously variable transmission mechanism being configured by stretching a power transmitting member between two pulleys, the friction engaging element being configured to change a power transmission state between a driving source and a driving wheel, the vehicle control method comprising:
determining whether the friction engaging element engages or not on the basis of an engaging instruction and a rotation difference between before and after a rotation of the friction engaging element;
calculating a target line pressure on the basis of an instructed torque capacity of the friction engaging element and a belt capacity when the friction engaging element is determined as not engaging by the engaging instruction, the belt capacity being calculated on the basis of an input torque of the continuously variable transmission mechanism;
calculating an amount of torque down in the driving source on the basis of an upper limit line pressure when the calculated target line pressure is higher than the upper limit line pressure;
calculating a limit torque capacity of the friction engaging element on the basis of the input torque of the continuously variable transmission mechanism and a belt capacity when the friction engaging element is determined as not engaging, the belt capacity being calculated on the basis of an actual line pressure; and
restraining a slip between the pulleys and the power transmitting member in the continuously variable transmission mechanism on the basis of the target line pressure, the amount of torque down, and the limit torque capacity when the friction engaging element is determined as not engaging.

7. A vehicle control device for controlling a vehicle including a continuously variable transmission mechanism and a friction engaging element, the continuously variable transmission mechanism being configured by stretching a power transmitting member between two pulleys, the friction engaging element being configured to change a power transmission state between a driving source and a driving wheel, the vehicle control device comprising:

engaging determination means for determining whether the friction engaging element engages or not on the basis of an engaging instruction and a rotation difference between before and after a rotation of the friction engaging element;

line pressure calculation means for calculating a target line pressure on the basis of an instructed torque capacity of the friction engaging element and a belt capacity when the engaging determination means determines that the friction engaging element does not engage by the engaging instruction, the belt capacity being calculated on the basis of an input torque of the continuously variable transmission mechanism;

drive torque calculation means for calculating an amount of torque down in the driving source on the basis of an upper limit line pressure when the calculated target line pressure is higher than the upper limit line pressure;

torque capacity calculation means for calculating a limit torque capacity of the friction engaging element on the basis of the input torque of the continuously variable transmission mechanism and a belt capacity when the friction engaging element is determined as not engaging, the belt capacity being calculated on the basis of an actual line pressure; and restraining means for restraining a slip between the pulleys and the power transmitting member in the continuously variable transmission mechanism on the basis of the target line pressure, the amount of torque down, and the limit torque capacity when the friction engaging element is determined as not engaging.

* * * * *